United States Patent
Ohta et al.

(10) Patent No.: US 7,911,559 B2
(45) Date of Patent: Mar. 22, 2011

(54) ILLUMINATING DEVICE AND DISPLAY USING THE SAME

(75) Inventors: Yuuki Ohta, Tsu (JP); Tetsuya Hamada, Matsusaka (JP); Noriyuki Ohashi, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 442 days.

(21) Appl. No.: 12/088,478

(22) PCT Filed: Jul. 19, 2006

(86) PCT No.: PCT/JP2006/314274
§ 371 (c)(1),
(2), (4) Date: Mar. 28, 2008

(87) PCT Pub. No.: WO2007/039975
PCT Pub. Date: Apr. 12, 2007

(65) Prior Publication Data
US 2009/0231513 A1 Sep. 17, 2009

(30) Foreign Application Priority Data
Sep. 30, 2005 (JP) ................... 2005-287482

(51) Int. Cl.
*G02F 1/1335* (2006.01)
*F21V 7/04* (2006.01)
(52) U.S. Cl. ............. 349/65; 349/61; 362/606; 362/608
(58) Field of Classification Search ............. 349/65, 349/61; 362/606, 608
See application file for complete search history.

(56) References Cited

U.S. PATENT DOCUMENTS
| | | | |
|---|---|---|---|
| 2004/0075643 A1* | 4/2004 | Watanabe | 345/156 |
| 2008/0049168 A1* | 2/2008 | Kubota | 349/65 |

FOREIGN PATENT DOCUMENTS
| | | | |
|---|---|---|---|
| JP | 11-224517 A | | 8/1999 |
| JP | 11-237630 A | | 8/1999 |
| JP | 11224517 A | * | 8/1999 |
| JP | 2002-075038 A | | 3/2002 |
| JP | 2003-156739 A | | 5/2003 |
| JP | 2003-279972 A | | 10/2003 |

OTHER PUBLICATIONS
Official communication issued in counterpart International Application No. PCT/JP2006/314274, mailed on Oct. 24, 2006.

* cited by examiner

Primary Examiner — Mike Qi
(74) Attorney, Agent, or Firm — Keating & Bennett, LLP

(57) ABSTRACT

An illuminating device achieves higher brightness by improving the utilization efficiency of light from a light source in an illuminating device for emitting plane-shaped light. The backlight device includes a light guide member, and LED units facing side surfaces of the light guide member, and propagates light that is emitted by the LEDs and made incident to the side surfaces in the light guide member so as to emit plane-shaped light from a first main surface of the light guide member. The backlight device includes an insulating reflective member placed outside a second main surface of the light guide member facing the first main surface, and a metal reflective sheet laminated on the insulating reflective sheet on the side opposite to the light guide member.

5 Claims, 5 Drawing Sheets

ILLUMINATING DEVICE AND DISPLAY USING THE SAME

SUMMARY OF THE INVENTION

1. Field of the Invention

The present invention relates to a so-called surface-emitting illuminating device for emitting plane-shaped light, and particularly relates to an illuminating device used as a backlight of a liquid crystal display device.

2. Description of the Related Art

In recent years, liquid crystal display devices with advantages such as low power consumption, thinness, and light weight have been used widely as display devices for television sets, personal computers, mobile phones, and the like. A liquid crystal display element is a so-called non-light-emitting display element that does not emit light by itself. Therefore, there has been developed a configuration in which a surface-emitting illuminating device (a so-called backlight) is provided on a main surface of the liquid crystal display element, for example, or ambient light is made incident to the liquid crystal display device as illumination light. A device with the former configuration is called a transmission liquid crystal display device, and a device with the latter configuration is called a reflective liquid crystal display device. Furthermore, there has been known conventionally a so-called semi-transmission type liquid crystal display device. Such a semi-transmission type liquid crystal display device uses ambient light as illumination light, and when required, it uses also illumination light from a backlight.

Backlights are divided broadly into direct-type and sidelight-type (also referred to as edge light) depending on how a light source is arranged relative to a liquid crystal display element. Direct-type backlight is configured by disposing a light source on the backside of a liquid crystal display element, and further disposing a diffusion board, a prism sheet and the like between the light source and the liquid crystal display element so that uniform plane-shaped light enters throughout the back of the liquid crystal display element.

On the other hand, a sidelight-type backlight includes a light guide member disposed on the backside of a liquid crystal display element, and light sources respectively disposed to face side surfaces (the side of the liquid crystal display element) of the light guide member. Light from the light sources is introduced into the light guide member through its side surfaces. The light introduced into the light guide member propagates while being totally reflected within the light guide member, and is emitted towards the back of the liquid crystal display element.

Conventionally, it has been known that a sidelight-type backlight is configured by disposing a reflective sheet outside the surface facing the light-emitting surface to a liquid crystal display element so that light leaking towards the side opposite to the liquid crystal display element enters again into the light guide member in order to improve the brightness (e.g., see such as JP 2002-75038 A (FIG. 1), JP 2003-156739 A (FIG. 2, paragraph [0024]), and JP 2003-279972 A (FIG. 2)). As such a reflective sheet, an aluminum foil sheet, a film sheet on which a white colorant is dispersed, a film sheet on which such as an aluminum metal film is formed, and the like have been used (see JP 2002-75038 A, paragraph [0031]).

As the development of light-emitting diodes (LED) has advanced recently, LEDs have been used preferably also as light sources of backlight. FIG. 7 is a plan view showing an example of an LED unit that has been used conventionally as a light source of backlight. An LED unit 20 shown in FIG. 7 has a configuration in which a plurality of LEDs 22 are aligned on a main surface of a board 21. As the LEDs 22, a white LED and LEDs for emitting each of RGB colors are used. Each of the LEDs 22 has wiring terminals 23. The terminals 23 are exposed on the surface of the board 21.

FIG. 8 is a cross sectional view showing an example of a conventional backlight device 90 using the LED units 20 as a light source. The conventional backlight device 90 shown in FIG. 8 includes a light guide member 91. The LED units 20 are disposed respectively on both side surfaces of the light guide member 91 in such a manner that emitted light from the LEDs 22 enters the side surfaces of the light guide member 91. When required, optical sheets such as a diffusion sheet 92 and a prism sheet (not shown) are laminated on the top of the light-emitting surface of the light guide member 91. A reflective sheet 93 is provided outside a surface of the light guide member 91, opposite to the light-emitting surface.

In the conventional backlight device 90 shown in FIG. 8, since the terminals 23 of each of the LED units 20 are exposed on the surface of the board 21 at the side surfaces of the light guide member 91 as described above, the reflective sheet 93 should be formed of an insulating material in order to prevent a short circuit or the like in the LEDs 22. That is, if a metal foil or a metal-evaporated sheet is used as the reflective sheet 93, the LEDs 22 may be short-circuited when an end of the reflective sheet 93 comes into contact with the terminals 23. An insulating film sheet on which a white colorant is dispersed or an insulating film sheet on which a white paint is applied is used for example, as the reflective sheet 93 made of an insulating material.

However, these insulating film sheets have a problem. Namely, though the insulating film sheets generally have better light diffusion, they have lower light reflectance in comparison to metal foils and metal-evaporated sheets.

SUMMARY OF THE INVENTION

In order to solve the problems described above, preferred embodiments of the present invention provide an illuminating device that achieves higher brightness by improving the utilization efficiency of light from a light source in an illuminating device for emitting plane-shaped light, and also provide a liquid crystal display device including such a novel illuminating device.

An illuminating device according to a preferred embodiment of the present invention includes a light guide member and a light-emitting element placed facing a side surface of the light guide member, and arranged to propagate light that is emitted by the light-emitting element and made incident to the side surface in the light guide member so as to emit plane-shaped light from a first main surface of the light guide member, wherein the illuminating device comprises an insulating reflective member located outside a second main surface of the light guide member facing the first main surface, and a metal reflective member laminated on the insulating reflective member on a side opposite to the light guide member.

Further, a liquid crystal display device according to a preferred embodiment of the present invention includes the illuminating device according to the above-described preferred embodiment of the present invention and a liquid crystal display element.

According to preferred embodiments of the present invention, it is possible to obtain an illuminating device with higher brightness by improving the utilization efficiency of light from a light source in an illuminating device for emitting plane-shaped light. Further, it is possible to obtain a high-quality liquid crystal display device using the illuminating device.

These and other features, elements, characteristics and advantages of the present invention will become more apparent from the following detailed description of preferred embodiments thereof with reference to the drawings.

DETAILED DESCRIPTION OF THE PREFERRED EMBODIMENTS

Figure 1:
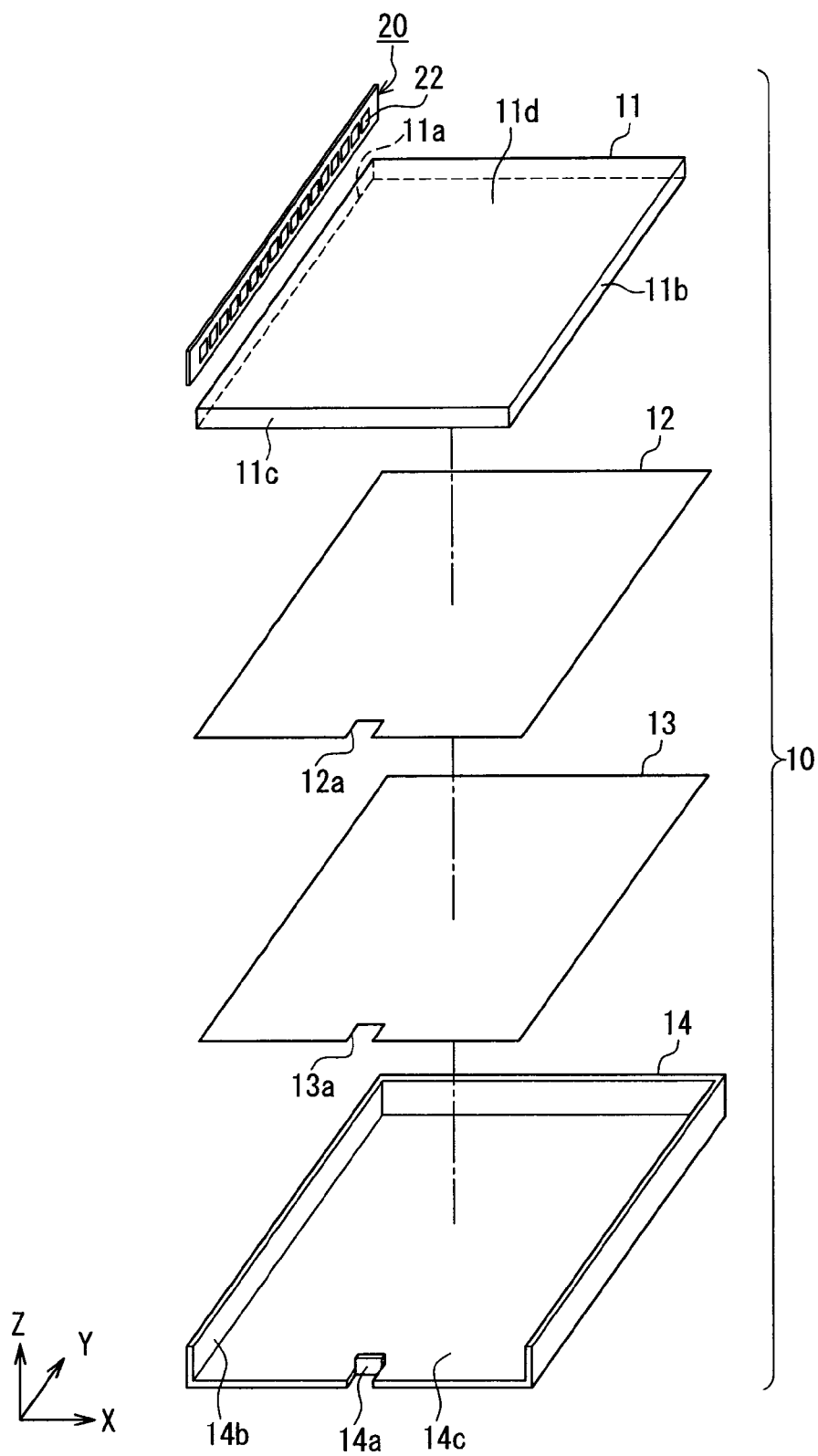
FIG. 1 is an exploded perspective view showing a schematic configuration of a backlight device according to a first preferred embodiment of the present invention.

The illuminating device according to preferred embodiments of the present invention includes a light guide member, and a light-emitting element placed facing a side surface of the light guide member. The illuminating device propagates light that is emitted by the light-emitting element and made incident to the side surface in the light guide member so as to emit plane-shaped light from a first main surface of the light guide member. The illuminating device includes an insulating reflective member located outside a second main surface of the light guide member facing the first main surface, and a metal reflective member laminated on the insulating reflective sheet on the side opposite to the light guide member.

According to the above configuration, since the metal reflective member is laminated on the insulating reflective member on the side opposite to the light guide member, a slight amount of leakage light that passed through the insulating reflective member is reflected by the metal reflective member and enters again the light guide member. Consequently, the utilization efficiency of light from the light source is improved, and thus an illuminating device with higher brightness can be obtained.

In the above illuminating device, it is preferable that the light-emitting element includes a wiring terminal at a position facing the side surface of the light guide member, the metal reflective member has conductivity, and the length of the metal reflective member in a normal line direction of the side surface of the light guide member facing the light-emitting element is shorter than that of the insulating reflective member. According to this preferred configuration, by making the length of the metal reflective member in a normal line direction of the side surface of the light guide member facing the light-emitting element to be shorter than that of the insulating reflective member, it is possible to prevent the conductive metal reflective member from coming into contact with the wiring terminal of the light-emitting element.

In the above preferred configuration, it is further preferable that an insulating member is provided between an end of the metal reflective member and the wiring terminal. This is because it is possible to prevent more surely the conductive metal reflective member from coming into contact with the wiring terminal of the light-emitting element.

In the above illuminating device, it is preferable that the light-emitting element includes a wiring terminal at a position facing the side surface of the light guide member, the metal reflective member has conductivity, and an end of the insulating reflective member intervene between an end of the metal reflective member and the wiring terminal. According to this configuration, since the end of the insulating reflective member intervenes between the end of the metal reflective member and the wiring terminal, it is possible to prevent more surely the conductive metal reflective member from coming into contact with the wiring terminal of the light-emitting element.

In the above illuminating device, it is preferable that a pressure member that applies pressure on an end of the insulating reflective member towards the light-emitting element side is provided between the metal reflective member and the end of the insulating reflective member in a normal line direction of a side surface of the light guide member facing the light-emitting element. With this configuration, since the end of the insulating reflective member is pressed towards the light-emitting element by the pressure member, it is possible to eliminate a gap between the insulating reflective member and the lower portion of the light-emitting element. Such a gap may cause leakage light. Consequently, the utilization efficiency of light is improved further, and thus a backlight device with higher brightness can be obtained.

Furthermore, the liquid crystal display device according to preferred embodiments of the present invention includes the illuminating device having any of the above configurations and a liquid crystal display element. According to this configuration, since the illuminating device with high brightness is provided, a liquid crystal display device with high display quality can be obtained.

Hereinafter, specific preferred embodiments of the present invention will be described with reference to the drawings.

First Preferred Embodiment

Figure 7:
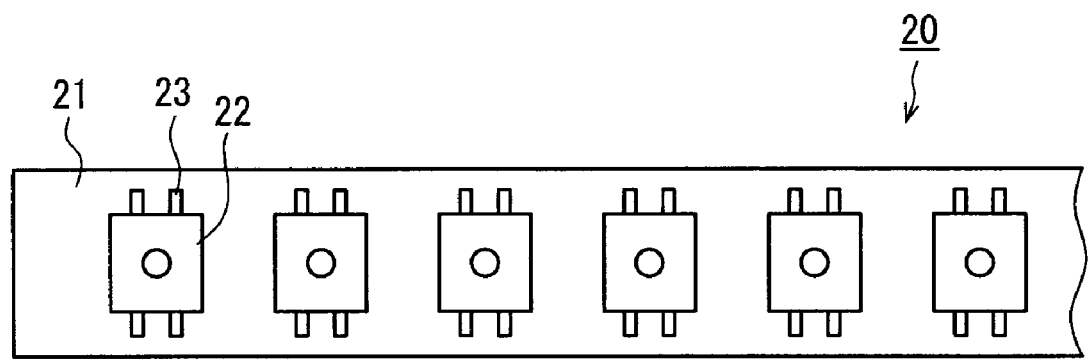
FIG. 7 is a plan view showing an example of an LED unit used conventionally as a light source of backlight.
Figure 8:
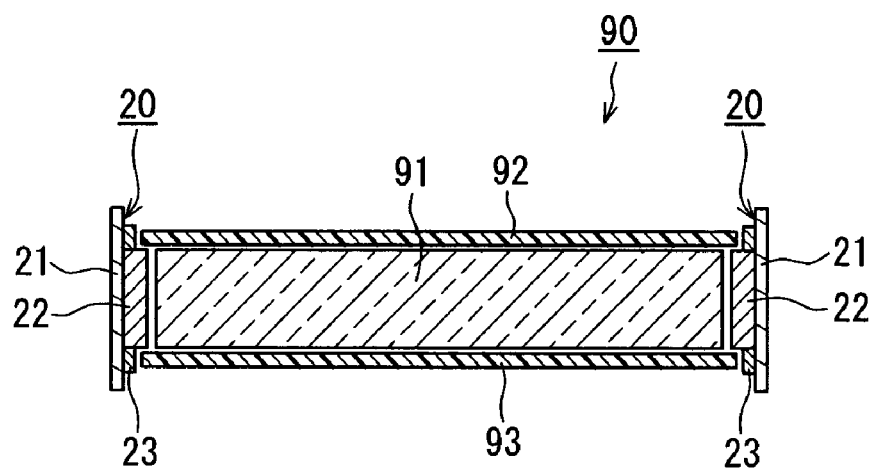
FIG. 8 is a cross sectional view showing an example of a conventional backlight device using the LED unit as a light source.

FIG. 1 is an exploded perspective view showing a schematic configuration of a backlight device 10 as an illuminating device according to a first preferred embodiment of the present invention. As shown in FIG. 1, the backlight device 10 includes a light guide member 11, an insulating reflective sheet 12, a metal reflective sheet 13, a frame 14, and LED units 20. Though only one LED unit 20 is shown in FIG. 1, the LED units 20 are preferably provided on both side surfaces of the light guide member 11 (see FIG. 2). The configuration of the LED unit 20 is as shown in FIG. 7. As LEDs (light-emitting element) 22, white LED and LEDs for emitting each of RGB colors are used.

Figure 2:
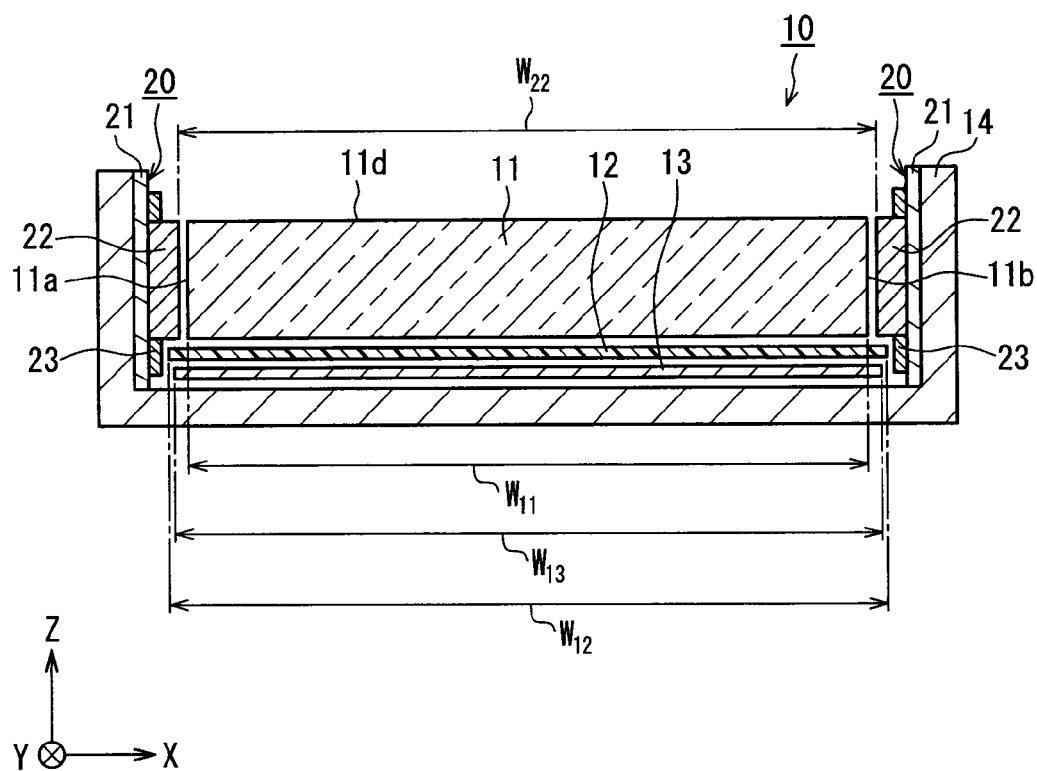
FIG. 2 is a cross sectional view showing the backlight device shown in FIG. 1 taken along the XZ plane shown in FIG. 1.

FIG. 2 is a cross sectional view of the backlight device 10 taken along a surface orthogonal to both a main surface of the board 21 of the LED unit 20 and a main surface of the light guide member 11 (the XZ plane shown in FIG. 1). As shown in FIGS. 1 and 2, the backlight device 10 is configured by laminating the metal reflective sheet 13, the insulating reflective sheet 12, and the light guide member 11 on a main surface 14c of the frame 14 in the stated order. Though not shown in FIGS. 1 and 2, a diffusion sheet, a prism sheet, and the like may be provided on the top of a light-exit surface 11d of the light guide member 11. The LED units 20 are arranged so as to face respectively a pair of facing side surfaces 11a, 11b of the light guide member 11.

In order to make the characteristics of preferred embodiments of the present invention easier to understand, the size of each component in FIGS. 1 and 2 differs from the actual configuration. For example, the aspect ratio of the light guide member 11 in FIG. 2 is different from the actual ratio. Further, the thicknesses of the metal reflective sheet 13 and the insulating reflective sheet 12, and a gap between these sheets are exaggerated in the drawings in order to facilitate the understanding of preferred embodiments of the present invention. In reality, the light guide member 11, the metal reflective sheet 13, and the insulating reflective sheet 12 are laminated without any substantial gap.

In the backlight device 10, the LED units 20 are preferably arranged along a sidewall 14b of the frame 14. That is, as shown in FIG. 2, the boards 21 of the LED units 20 are fixed respectively to the sidewall 14b of the frame 14 with an adhesive, screws or the like (either of them is not shown). The light guide member 11 is disposed in such a manner that its side surfaces face respectively the LEDs 22 of the LED units 20, so that emitted light from the LEDs 22 is introduced into the light guide member through the side surfaces of the light guide member 11.

The light guide member 11 is a flat plate made of a transparent resin such as an acrylic resin. The insulating reflective sheet 12 is made of polyethylene terephthalate (PET) that is colored in white by dispersing a white colorant or applying a white paint. The metal reflective sheet 13 is a silver-evaporated PET sheet. The frame 14 is formed of metal or a resin.

However, the materials of the insulating reflective sheet 12 and the metal reflective sheet 13 are not limited to the above examples. A polyester-based resin (including PET mentioned above), polycarbonates (e.g., bisphenol A based polycarbonate), polyolefins (e.g., polyethylene, polypropylene, and the like), cellulose dielectrics (e.g., cellulose triacetate), a vinyl-based resin (polyvinylidene chloride), polyimides, polyamides, polyether-sulfone, a polysulfone-based resin, a polyarylate-based resin, and a fluorine-based resin may be used as materials of the insulating reflective sheet 12. Further, a silver foil, an aluminum foil, an alloy foil based on silver, an alloy foil based on aluminum, a silver-evaporated sheet, an aluminum-evaporated sheet, a silver-based-alloy-evaporated sheet, and an aluminum-based-alloy-evaporated sheet can be used as the metal reflective sheet 13.

As described above, by disposing the metal reflective sheet 13 under the insulating reflective sheet 12, a slight amount of light that passed through the insulating reflective sheet 12 is reflected by the metal reflective sheet 13 and enters again the light guide member 11. This is because the metal reflective sheet 13 using aluminum, silver, or an alloy thereof has higher reflectivity than the insulating reflective sheet 12 colored in white. Accordingly, the utilization efficiency of light is improved, and the brightness of the backlight device 10 can be improved.

As shown in FIG. 2, a width $W_{12}$ of the insulating reflective sheet 12 is larger than a width $W_{11}$ of the light guide member 11. By increasing the width $W_{12}$ of the insulating reflective sheet 12 to be larger than the width $W_{11}$ of the light guide member 11, it is possible to prevent light from leaking towards the side opposite to the light-exit surface 11d through gaps between the light guide member 11 and the LEDs 22.

Further, it is preferable that the width $W_{12}$ of the insulating reflective sheet 12 is larger than a distance $W_{22}$ between the surfaces of the LEDs 22 on the two LED units 20. By increasing the width $W_{12}$ of the insulating reflective sheet 12 to be larger than the distance $W_{22}$ between the surfaces of the LEDs 22 on the two LED units 20, it is possible to prevent more surely light from leaking towards the side opposite to the light-exit surface 11d through the gaps between the light guide member 11 and the LEDs 22. In the configuration shown in FIG. 2, although there are slight gaps between the insulating reflective sheet 12 and the terminals 23 of the LED units 20, problems will not be caused even if the ends of the insulating reflective sheet 12 come into contact with the terminals 23.

The metal reflective sheet 13 is formed in such a manner that the width $W_{13}$ is smaller than the width $W_{12}$ of the insulating reflective sheet 12. Though it is preferable that the width $W_{13}$ of the metal reflective sheet 13 is larger than the distance $W_{22}$ between the surfaces of the LEDs 22 on the two LED units 20, the width $W_{13}$ should be in a range where the ends of the metal reflective sheet 13 do not come into contact with the terminals 23 of the LED units 20.

As shown in FIG. 1, a protrusion 14a is provided at a portion of the side of the frame 14 to which the LED units 20 are not attached. Further, a notch 13a is formed on the metal reflective sheet 13 at a position that overlaps with the protrusion 14a. A notch 12a is formed also on the insulating reflective sheet 12 at a position that overlaps with the protrusion 14a. Thus, since the protrusion 14a fits into the notch 13a of the metal reflective sheet 13 and the notch 12a of the insulating reflective sheet 12, misalignment of the metal reflective sheet 13 and the insulating reflective sheet 12 in the X direction is prevented. The light guide member 11 is formed in such a manner that when it is incorporated in the frame 14, the side surface 11c comes into contact with the protrusion 14a.

A structure or method for preventing misalignment of the metal reflective sheet 13 and the insulating reflective sheet 12 is not limited to the fit between the protrusion and the notches as described above. For example, a positioning pin may be provided at at least one portion of the frame 14 and a hole may be formed on the metal reflective sheet 13 and on the insulating reflective sheet 12 so as to match the position of the pin.

As described above, the backlight device 10 according to this preferred embodiment includes the metal reflective sheet 13 underneath the insulating reflective sheet 12, thereby providing an effect of improving the brightness. Furthermore, since the metal reflective sheet 13 is formed in such a manner that the width $W_{13}$ is to be smaller than the width $W_{12}$ of the insulating reflective sheet 12, the ends of the metal reflective sheet 13 are prevented from coming into contact with the terminals 23 of the LED units 20.

Figure 3:
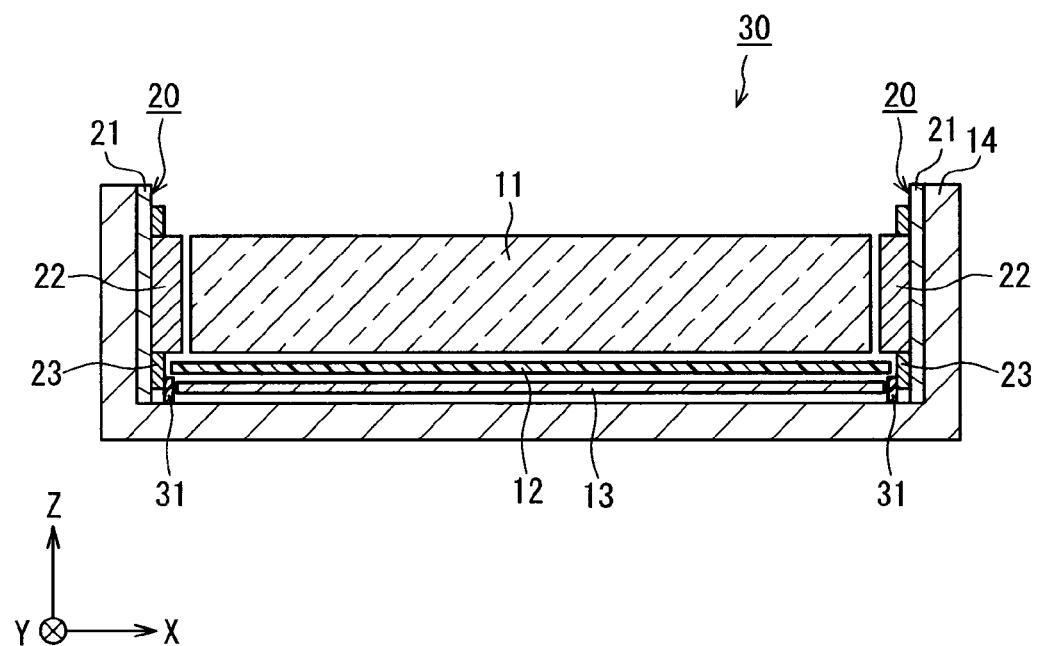
FIG. 3 is a cross sectional view showing a configuration of a backlight device as a variation of the illuminating device according to the first preferred embodiment of the present invention.

FIG. 3 is a cross sectional view showing a configuration of a backlight device 30 as a variation of the illuminating device according to this preferred embodiment. As shown in FIG. 3, similarly to the backlight device 10, the backlight device 30 includes the light guide member 11, the insulating reflective sheet 12, the metal reflective sheet 13, the frame 14, and the LED units 20. However, the backlight device 30 is different from the backlight device 10 in that an insulating member 31 is provided between both ends of the metal reflective sheet 13 (both ends in the X direction shown in FIG. 3) and the terminals 23 of the LED units 20.

The insulating member 31 can be formed by using PET (polyester-based), silicon, a rubber tape, or the like. The insulating member 31 can be placed between the both ends of the metal reflective sheet 13 and the terminals 23 by fixing to the frame 14 or to the terminals 23 of the LED units 20, or attaching insulating tape or the like to the both ends of the metal reflective sheet 13.

Since the backlight device 30 includes the insulating member between the both ends of the metal reflective sheet 13 and the terminals 23, it is possible to prevent more surely the LEDs 22 from being short-circuited due to the metal reflective sheet 13.

Second Preferred Embodiment

Figure 4:
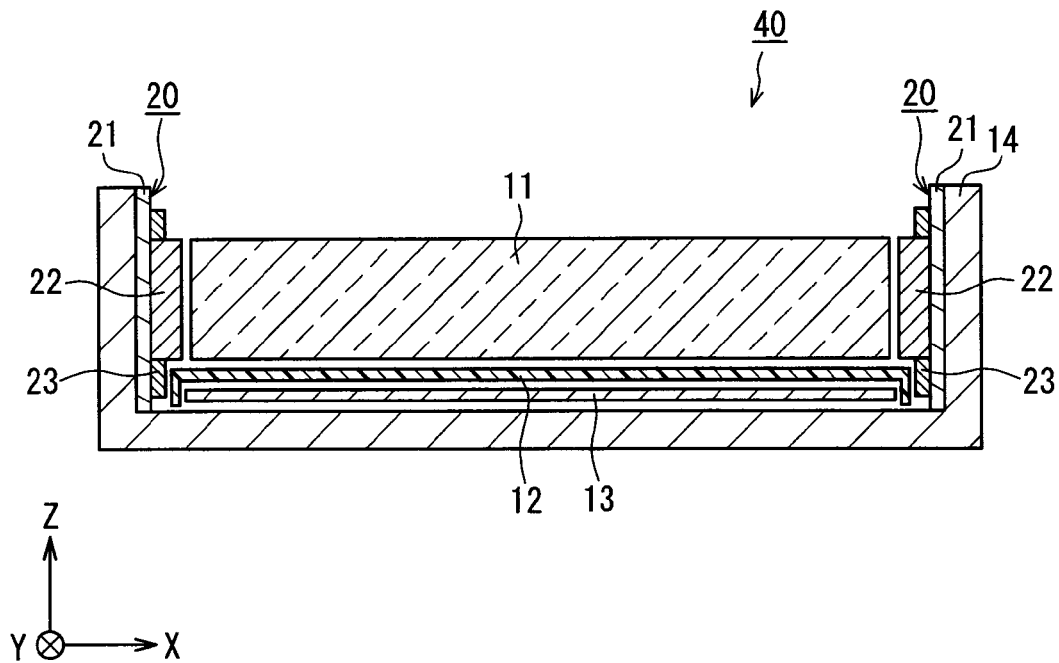
FIG. 4 is a cross sectional view of a backlight device according to a second preferred embodiment of the present invention.

Hereinafter, another preferred embodiment of the illuminating device according to the present invention will be described. The same reference numerals used in the description of the first preferred embodiment are assigned to components similar to those described in the first preferred embodiment, and detailed description thereof will not be repeated. FIG. 4 is a cross sectional view of a backlight device 40 as the illuminating device according to this preferred embodiment.

As shown in FIG. 4, similarly to the backlight device 10 according to the first preferred embodiment, the backlight device 40 includes the light guide member 11, the insulating reflective sheet 12, the metal reflective sheet 13, the frame 14, and the LED units 20. However, the backlight device 40 is different from the backlight device 10 in the first preferred embodiment in that both ends of the insulating reflective sheet 12 (both ends in the X direction of FIG. 4) are folded at a substantially right angle at the lower portion of the LED units 22, and they intervene between ends of the metal reflective sheet 13 and the terminals 23 of the LED units 20.

That is, since the insulating reflective sheet 12 intervenes between the ends of the metal reflective sheet 13 and the terminals 23 of the LED units 20, the backlight device 40 provides the effect of more surely preventing a short-circuit in the LEDs 22 due to the metal reflective sheet 13, in addition to the effects of the backlight device 10 described in the first preferred embodiment.

Third Preferred Embodiment

Figure 5:
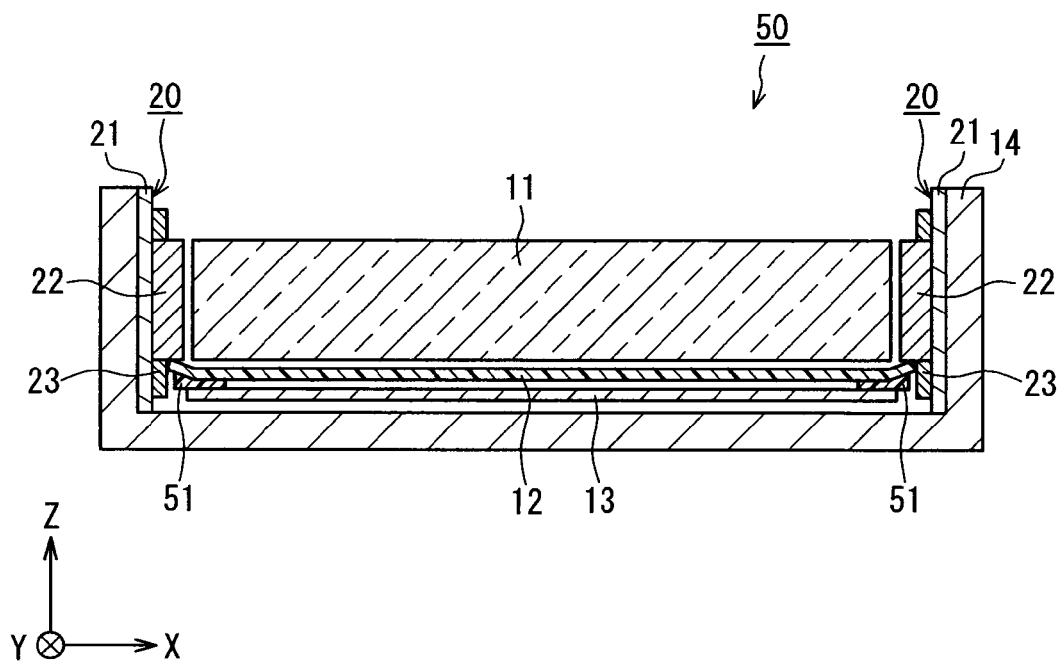
FIG. 5 is a cross sectional view of a backlight device according to a third preferred embodiment of the present invention.

Hereinafter, another preferred embodiment of the illuminating device according to the present invention will be described. The same reference numerals used in the first preferred embodiment are assigned to components similar to those described in the first preferred embodiment, and detailed description thereof will not be repeated. FIG. 5 is a cross sectional view of a backlight device 50 as the illuminating device according to this preferred embodiment.

As shown in FIG. 5, similarly to the backlight device 10 according to the first preferred embodiment, the backlight device 50 includes the light guide member 11, the insulating reflective sheet 12, the metal reflective sheet 13, the frame 14, and the LED units 20. However, the backlight device 50 is different from the backlight device 10 in the first preferred embodiment in that spacers 51 (pressure member) having a substantial wedge shape are provided between the insulating reflective sheet 12 and the metal reflective sheet 13 along a side of both ends (both ends in the X direction of FIG. 5) of the insulating reflective sheet 12.

As shown in FIG. 5, each of the spacers 51 is formed to be thicker on the end side of the insulating reflective sheet 12, and the thickness gets smaller as being separated further from the end of the insulating reflective sheet 12. By providing such wedge-shape spacers 51 between the insulating reflective sheet 12 and the metal reflective sheet 13, the both ends of the insulating reflective sheet 12 in the X direction are pushed up towards the lower portion of the LEDs 22, thereby eliminating gaps between the insulating reflective sheet 12 and the lower portion of the LEDs 22 that cause leakage light. Consequently, the utilization efficiency of light is improved further, and thus a backlight device with higher brightness can be obtained.

As the material of the spacers 15, PET (polyester-based), silicon, rubbers and the like can be used, for example. The spacers 51 may be bonded to the ends of the insulating reflective material 12 or to the ends of the metal reflective sheet 13.

Fourth Preferred Embodiment

A preferred embodiment of a liquid crystal display device including the illuminating device according to the present invention will be described. The same reference numerals used in the above-described preferred embodiments are assigned to components similar to those described in each of the above-described preferred embodiments, and detailed description thereof will not be repeated.

Figure 6:
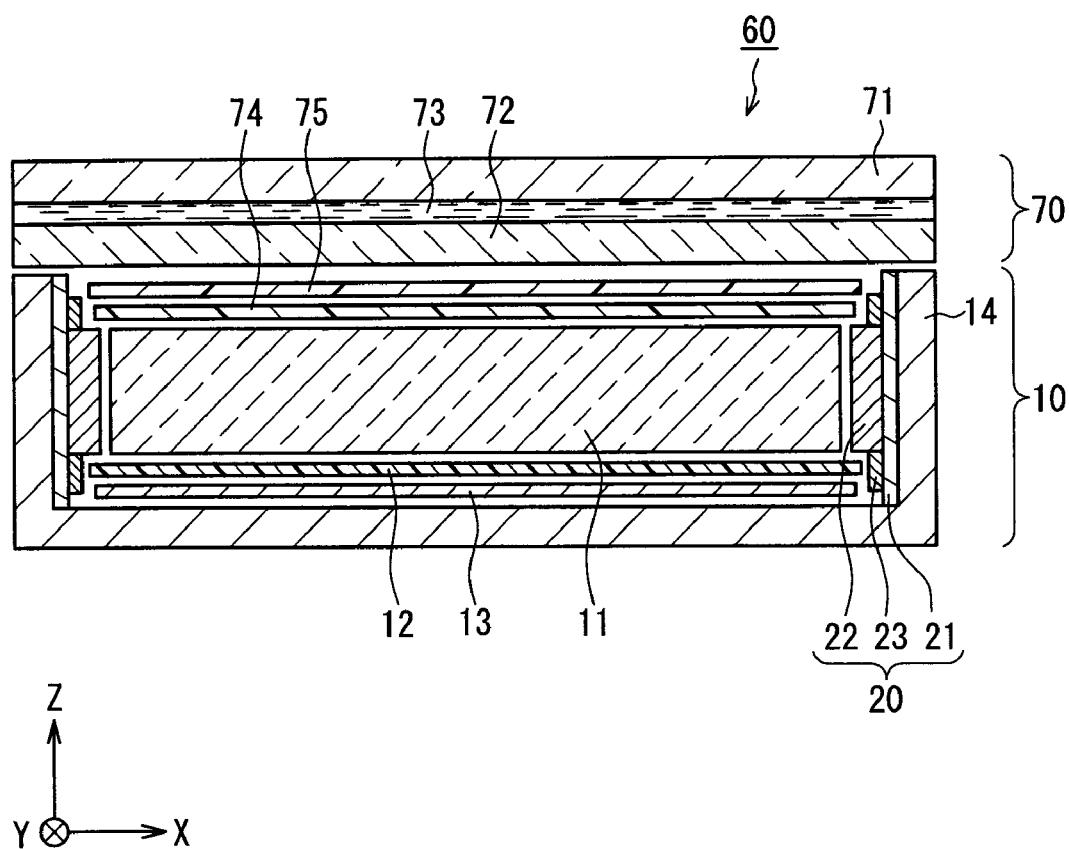
FIG. 6 is a cross sectional view of a liquid crystal display device according to a fourth preferred embodiment of the present invention.

FIG. 6 is a cross sectional view showing a schematic configuration of a liquid crystal display device 60 according to this preferred embodiment. As shown in FIG. 6, the liquid crystal display device 60 has a configuration in which the backlight device 10 is provided on the back of a liquid crystal display element 70. A diffusion sheet 74, a prism sheet 75, and the like are laminated on the top of the light guide member 11 of the backlight device 10. Though it is not shown in FIG. 6, a variety of optical sheets may be laminated on the display surface of the liquid crystal display element 70. A housing for holding the liquid crystal display element 70 and the backlight device 10 together is also not shown in FIG. 6.

The liquid crystal display element 70 is configured by filling the space between a pair of glass substrates 71, 72, which are bonded together through a sealing material (not shown), with a liquid crystal 73. Since the liquid crystal display element to be combined with the illuminating device of the present invention is not limited particularly as long as it is a transmission type or a semi-transmission type, and since the element configurations, the driving modes, and the like are selected arbitrarily, detailed description thereof will be omitted. However, as an example, the glass substrate 71 is an active matrix substrate including TFT (Thin Film Transistor) and the glass substrate 72 is a counter substrate including a counter electrode, for example.

The liquid crystal display device 60 according to this preferred embodiment includes the backlight device 10 having high utilization efficiency of light and high brightness as described above, so that it provides the effects of excellent display quality and low power consumption. Though the liquid crystal display device including the backlight device 10 according to the first preferred embodiment is used in this preferred embodiment, a liquid crystal display device using the backlight device 30, 40, or 50 in place of the backlight device 10 also provides similar effects.

The preferred embodiments of the illuminating device (backlight device) according to the present invention and the liquid crystal display device using the illuminating device were described above. The present invention is not limited only to these specific preferred embodiments.

For example, though the backlight device including the flat-shaped light guide member was preferably used in the above-described preferred embodiments, the light guide member is not limited to a flat shape, and it may be a wedge shape, for example. Further, an arbitrary pattern may be formed on the bottom and the surface of the light guide member.

Though the above-described preferred embodiments refer to an example of configuration in which a pair of the LED units are provided on the both side surfaces of the light guide member, the LED unit may be provided on only one side surface. Or the LED units may be also provided on a side surface and also on an adjacent side surface (namely in an L shaped configuration).

Though the LED unit in which a plurality of LEDs are aligned was preferably used in the above-described preferred embodiments, the number of LEDs as light sources can be determined arbitrarily.

The present invention is industrially applicable as an illuminating device with high utilization efficiency of light and high brightness and a high-quality liquid crystal display device using the illuminating device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. An illuminating device comprising:
    a light guide member;
    a light-emitting element facing a side surface of the light guide member, and propagating light that is emitted by the light-emitting element and made incident to the side surface in the light guide member so as to emit plane-shaped light from a first main surface of the light guide member;
    an insulating reflective member located outside a second main surface of the light guide member facing the first main surface; and
    a metal reflective member laminated on the insulating reflective member on a side opposite to the light guide member; wherein
    the light-emitting element includes a wiring terminal at a position facing the side surface of the light guide member, the metal reflective member has conductivity, and a length of the metal reflective member in a normal line direction of the side surface of the light guide member facing the light-emitting element is shorter than that of the insulating reflective member.

2. The illuminating device according to claim 1, wherein an insulating member is provided between an end of the metal reflective member and the wiring terminal.

3. The illuminating device according to claim 1, wherein the light-emitting element includes a wiring terminal at a position facing a side surface of the light guide member, the metal reflective member has conductivity, and an end of the insulating reflective member intervenes between an end of the metal reflective member and the wiring terminal.

4. The illuminating device according to claim 1, wherein a pressure member that applies pressure on an end of the insulating reflective member towards the light-emitting element is provided between the metal reflective member and the end of the insulating reflective member in a normal line direction of a side surface of the light guide member facing the light-emitting element.

5. A liquid crystal display device comprising the illuminating device according to claim 1 and a liquid crystal display element.

* * * * *